United States Patent [19]
Cocroft

[11] 3,854,419
[45] Dec. 17, 1974

[54] AERIAL TRAMWAY DRIVE ASSEMBLY
[75] Inventor: Kelly H. Cocroft, Mesa, Ariz.
[73] Assignee: Skytram Systems, Inc., Scottsdale, Ariz.
[22] Filed: Apr. 9, 1973
[21] Appl. No.: 349,567

[52] U.S. Cl.................... 105/153, 104/93, 104/112, 188/41, 295/31 R
[51] Int. Cl........ B60b 17/02, B61b 7/06, B61h 7/12
[58] Field of Search........ 104/89, 93, 112; 105/150, 105/153; 152/382, 411, 412, 413; 295/31 R; 188/41, 44

[56] References Cited
UNITED STATES PATENTS

| | | | |
|---|---|---|---|
| 832,319 | 10/1906 | Humphrey | 295/31 R X |
| 924,334 | 6/1909 | Fouch | 152/413 |
| 1,748,309 | 2/1930 | Rose | 295/31 R X |
| 3,353,503 | 11/1967 | Pettit | 105/150 |

Primary Examiner—Lloyd L. King
Assistant Examiner—Howard Beltran
Attorney, Agent, or Firm—Strauch, Nolan, Neale, Nies & Kurz

[57] ABSTRACT

An aerial tramway drive assembly comprises inner and outer drive wheel rim members detachably secured together for axial assembly and separation, and the rim members have similar oppositely inwardly inclined annular tire mounting surfaces each formed with circumferentially alternate axially extending projections and recesses. A resilient tire with a concave tread area is mounted on and between members, the tire having an inner periphery bridging both of the tire mounting surfaces and conforming in contour to interlock with the rim members at those surfaces, and being formed on opposite sides with annular surface recesses within which fit annular projecting ribs of the respective wheel rim members.

12 Claims, 15 Drawing Figures

AERIAL TRAMWAY DRIVE ASSEMBLY

This invention relates to aerial tramway drive systems and particularly to drive wheel and tire arrangements for propelling a tramway vehicle along a fixed cable.

Fixed cable systems are known wherein the vehicle is mounted on an articulated suspension structure having motor driven wheels engaging the upper side of the cable and pressure rolls engaging the underside of the cable are power operated to urge the cable into increased traction engagement with the drive wheels. A fixed cable system of this type is disclosed in Pettit U.S. Pat. No. 3,353,503 issued Nov. 21, 1967 and the present invention provides as its major object improved drive wheel structure and tire arrangements that may be used in such systems.

The Pettit patent also discloses that it is known to provide rubber cable engaging tires on the drive wheels of such systems. In this respect the present invention provides a novel drive wheel and associated resilient tire construction and this is an important object of the invention.

More specifically it is an object of the invention to provide novel interlocking projection and recess formations on the wheel rim and the tire that provide for secure mounting of the tire on the rim during drive operation but permit the tire to be removed and/or installed while at least the major part of the wheel rim remains mounted on the vehicle.

A further object of the invention is to provide a novel rim structure for a tramway vehicle drive wherein separably attached opposed rim members have similar oppositely inwardly inclined tire mounting surfaces peripherally formed with alternate projections and recesses for mounting a tire having correspondingly formed inner periphery.

Another object of the invention is to provide a novel drive wheel assembly for a tramway vehicle wherein coacting wheel rim members having cooperating tire mounting surfaces are detachably secured together in such a manner that the tire may be installed or removed when only one of the rim members is detached.

A further object of the invention is to provide a novel integral resilient tramway drive wheel tire having its inner periphery formed with two series of oppositely inwardly converging similar projections and recesses, and its opposite side walls formed with similar annular wheel rim rib receiving recesses.

Further objects of the invention will appear as the disclosure proceeds in connection with the appended claims and the accompanying drawings.

PREFERRED EMBODIMENTS

Figure 1:
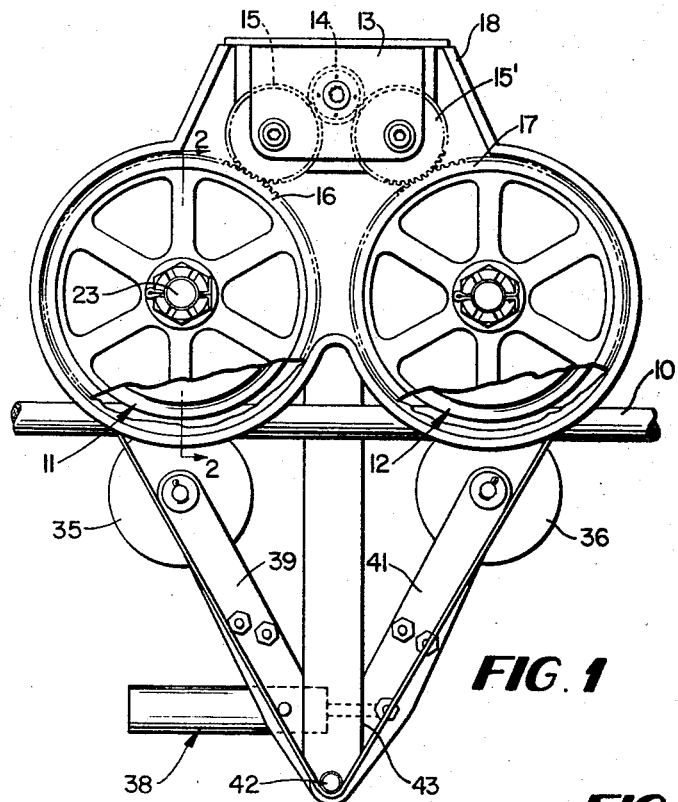
FIG. 1 is a side elevation showing a tramway drive assembly wherein the invention is incorporated.
Figure 2:
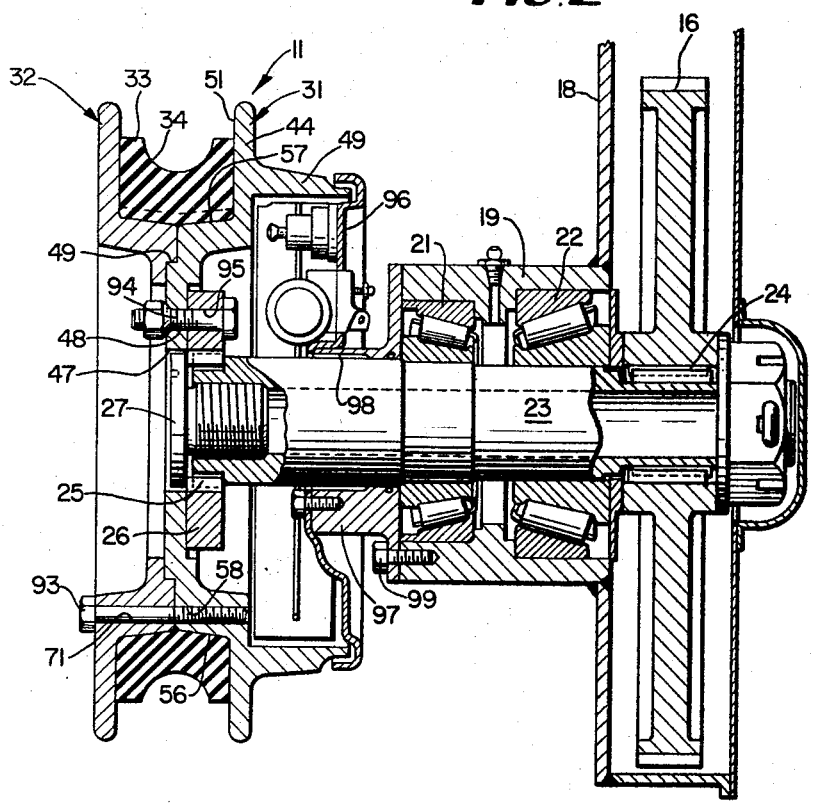
FIG. 2 is an enlarged section substantially on line 2—2 of FIG. 1 particularly showing the assembled drive wheel structure.

The preferred environment of the invention is shown in FIG. 1 wherein a tramway cable 10 is illustrated as supporting two of the drive wheels 11 and 12 of the tram vehicle. A motor 13 has an output shaft mounted gear 14 connected by gear 15 to drive gear 16 for wheel 11 and by gear 15' to drive gear 17 for wheel 12. The drive structure is the same at each wheel and FIG. 2 shows the details with respect to wheel 11.

The foregoing gearing is mounted in a fixed housing 18 having an external hollow boss 19 mounting two tapered roller bearing units 21 and 22. The inner races of these bearings are fixed on a horizontal shaft 23, so that shaft 23 is rotatably mounted on the gear housing and its inner end projects within the housing where it is non-rotatably secured to the hub of gear 16 as by the splined connection 24.

Figure 3:
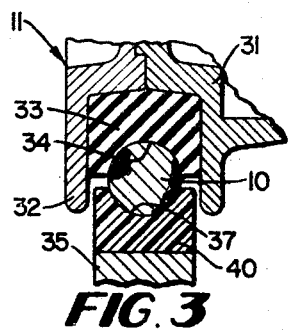
FIG. 3 is an enlarged fragmentary view in section showing engagement of the drive wheel assembly with the cable.

At its outer end shaft 23 is externally splined at 25 to non-rotatably mount an internally splined annular wheel support plate 26, and a threaded plug 27 secured in the end of shaft 23 fixes plate 26 longitudinally on the shaft. The wheel 11 consists essentially of an inner rim 31 (FIGS. 4–7) secured to an outer rim 32 (FIGS. 8–11) and a tire 33 (FIGS. 12–15) of synthetic rubber or like resilient oil resistant material mounted on the rim. Tire 33 has a concave, substantially semi-cylindrical surface 34 around its periphery adapted to receive the upper side of the cable as shown in FIG. 3. Two pressure rollers comprise metal wheels 35 and 36 mounting solid polyurethane tires 40 having similar semi-cylindrical cable engaging surfaces, as shown at 37 in FIG. 3. The pressure rollers are urged into contact with the bottom of the cable by mechanism powered by a hydraulic motor 38 having its cylinder pivotally mounted on one roller mounting arm 39 and its piston rod pivotally connected to the other roller mounting arm 41. Arms 39 and 41 are pivotally mounted at 42 on a depending support 43 rigid with the gear housing 18, so that the upward pressure exerted by the pressure rollers adds to the weight carried by the drive wheels in urging the relatively resilient surface 34 of the tire into increased tractive engagement with the cable.

FIGS. 4–7 show the inner wheel rim 31 which comprises an annular radially extending outer wheel side portion 44, an axially inwardly extending annular tire seating portion 45 and an annular radially extending mounting portion 46 having a central recess 47 surrounded by a circumferential row of bolt holes 48. An annular brake drum 49 projects from the outer side of side portion 44. The inner surface 51 of side portion 44 lies in a plane normal to the drive wheel axis, and surface 51 is flat and smooth except for an inwardly projecting annular constant cross-section tire engaging rib 52, shown in enlarged detail in FIG. 7. Preferably, rib 52 is formed by sides projecting in converging relation at an acute angle, about 30°, from surface 51 and merging to a smoothly rounded terminal. Rib 52 is of constant cross section throughout its length.

The outer periphery of tire seating portion 45 is formed with a plurality of equally spaced alternate sharp cornered projections 53 and recesses 54 which are respectively identical. In a practical embodiment each projection and recess has an arcuate extent of 15°, but this is not critical although a large number should be provided for optimum tire holding as will appear.

Figure 4:
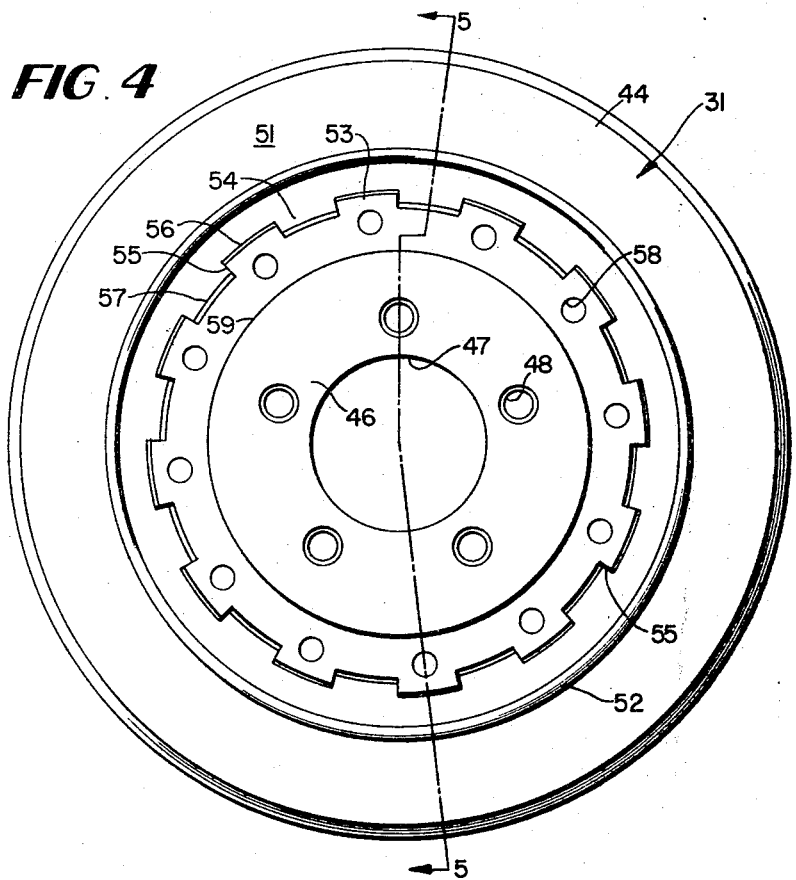
FIG. 4 is a side elevation showing the inner side of the inner rim of the drive wheel.
Figure 5:
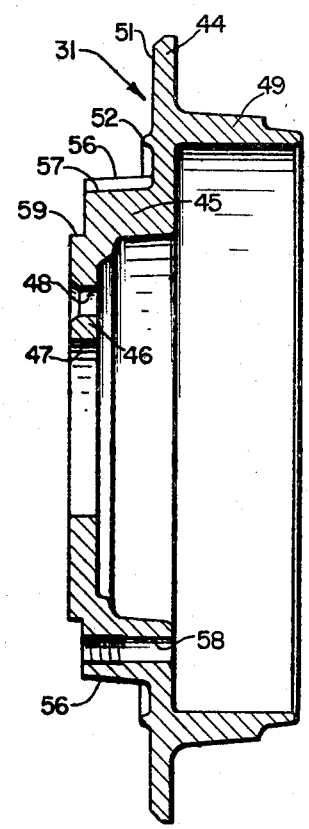
FIG. 5 is a section substantially on line 5—5 of FIG. 4.
Figure 6:
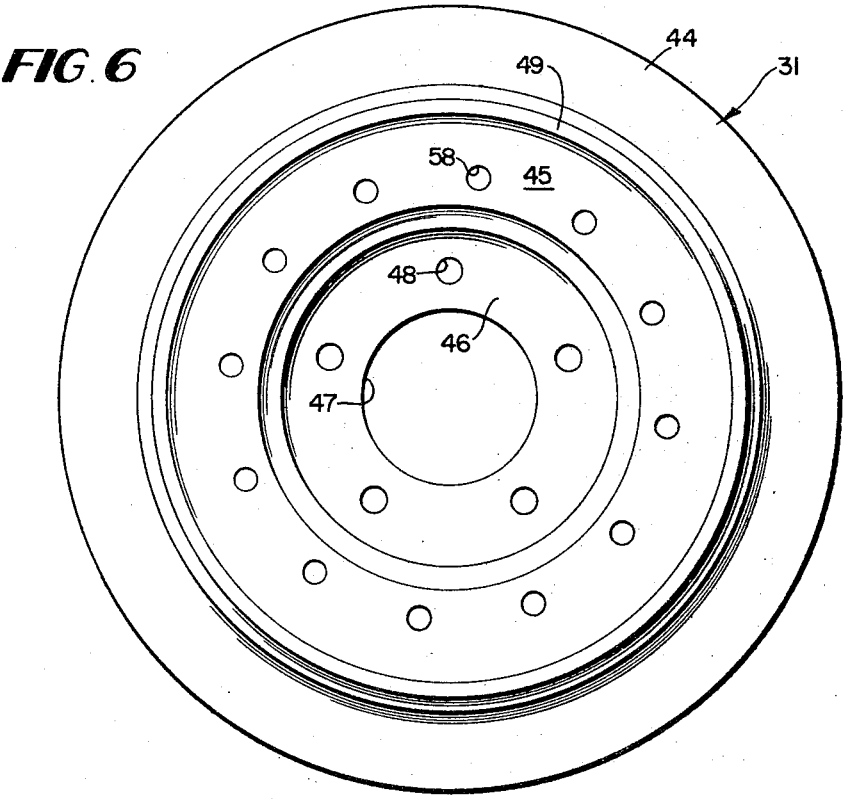
FIG. 6 is a side elevation showing the outer side of the inner rim of the drive wheel.
Figure 7:
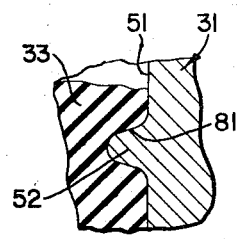
FIG. 7 is an enlarged fragmentary view in section showing the shape of the annular tire engaging rib on the rim of FIGS. 4–6.

The side surfaces 55 of each projection and recess are flat and smooth and lie in radial planes. The top surface 56 of each projection is circumferentially arcuate and is inclined to taper inwardly from side surface 51 at an acute angle which for example may be about 5° to the wheel axis. Similarly the bottom surface 57 of each recess 54 is circumferentially arcuate and is inclined to taper inwardly at about the same acute angle. A series of equally circumferentially spaced partly threaded bores 58 extend around the tire seating portion 45, preferably one for each projection as shown in FIG. 4.

The mounting portion 46 of the inner rim contains radially inwardly of the tire mounting portion an annular pilot surface 59 which may taper inwardly at a very small acute angle.

FIGS. 8–11 show the outer wheel rim 32 which comprises an annular radially extending outer wheel side portion 61 and an axially inwardly extending annular tire seating portion. The inner surface 63 of side portion 61 lies in a plane normal to the drive wheel axis, and surface 63 is flat and smooth except for an inwardly projecting annular constant cross-section tire engaging rib 64, shown in enlarged detail in FIG. 11. Rib 64 is of the same size, diameter and shape as rib 52.

The outer periphery of tire seating portion 62 is formed with a plurality of equally spaced alternate sharp cornered projections 65 and recesses 66 which are respectively identical. In a practical embodiment each projection and recess has an arcuate extent of 15°, the same as in the inner wheel rim 31.

Figure 8:
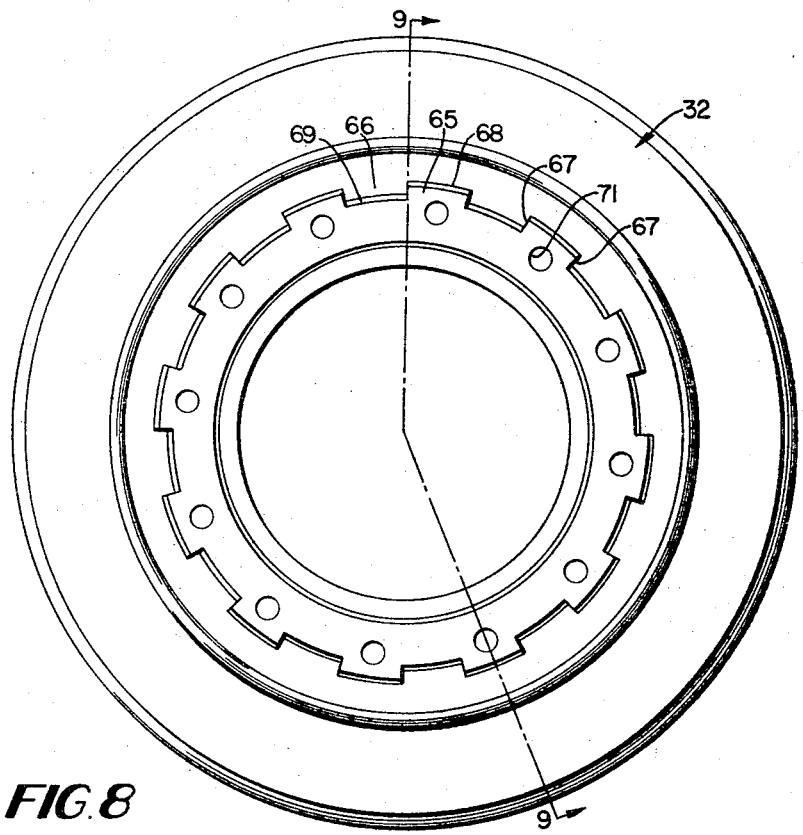
FIG. 8 is a side elevation showing the inner side of the outer rim of the drive wheel.
Figure 9:
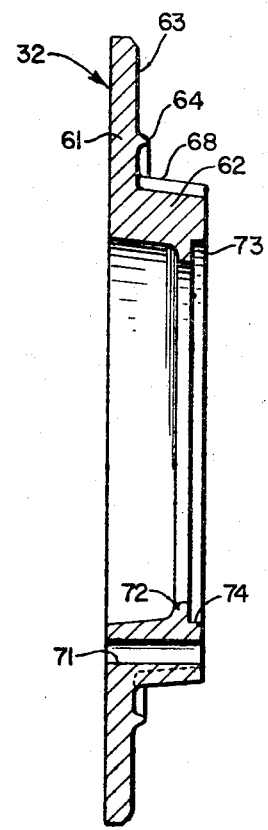
FIG. 9 is a section substantially on line 9—9 of FIG. 8.
Figure 10:
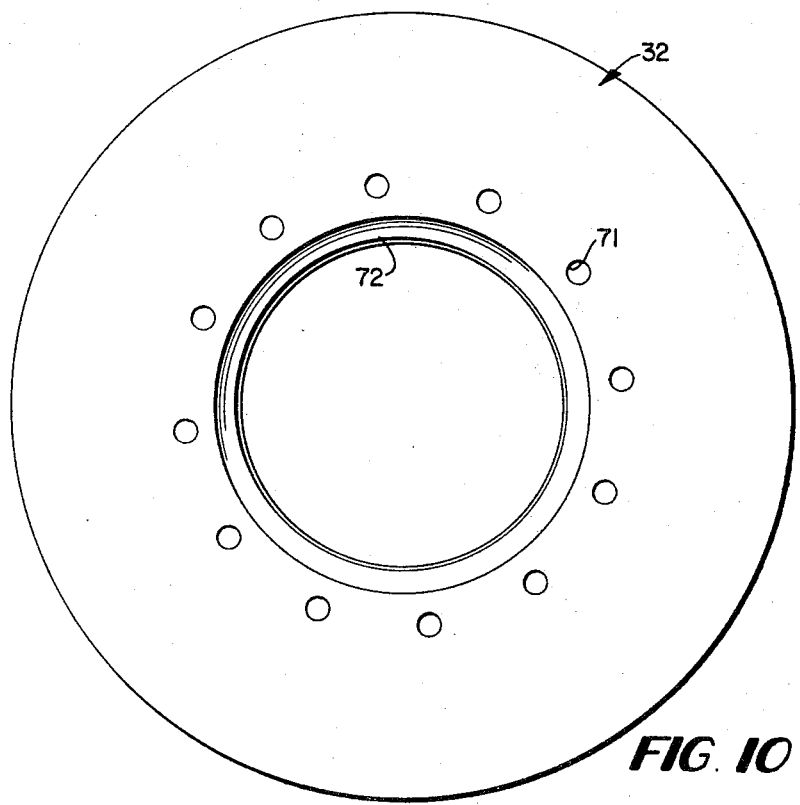
FIG. 10 is a side elevation showing the outer side of the outer rim of the drive wheel.
Figure 11:
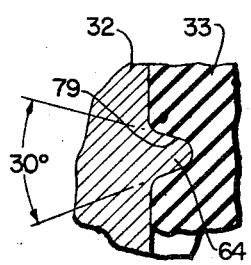
FIG. 11 is an enlarged fragmentary view in section showing the shape of the annular tire engaging rib.
Figure 12:
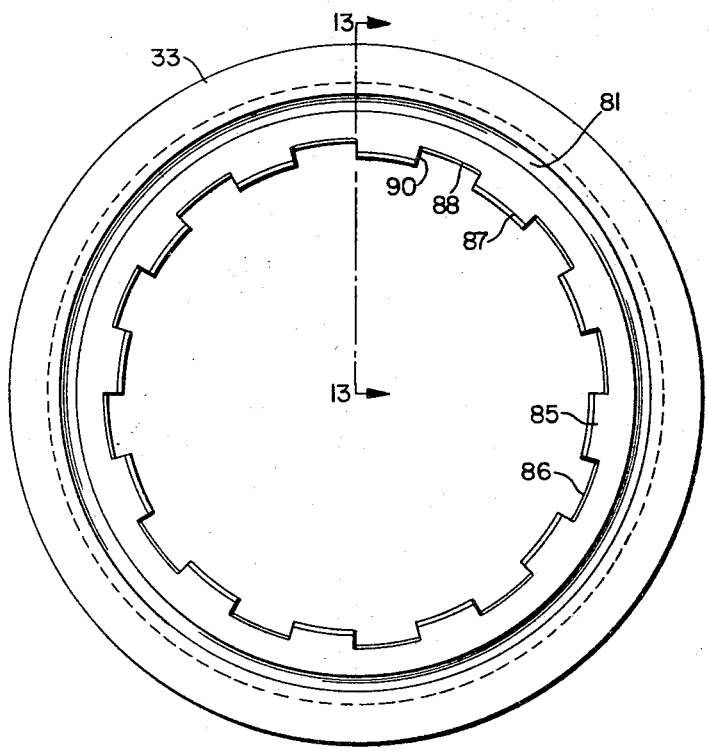
FIG. 12 is a side elevation of the tire of the drive wheel assembly.
Figure 13:
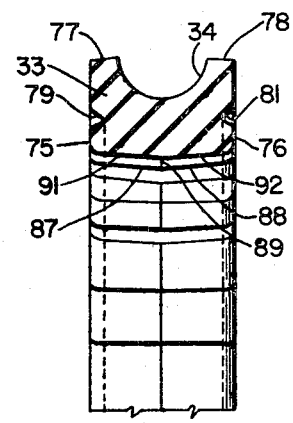
FIG. 13 is an end view partly in section substantially on line 13—13 of FIG. 12 showing tire structure detail.

The side surfaces 67 of each projection and recess are flat and smooth and lie in radial planes. The top surface 68 of each projection is circumferentially arcuate and is inclined to taper inwardly from side surface 63 at an acute angle which as in the inner rim may be about 5° to the wheel axis. Similarly the bottom surface 69 of each recess 66 is circumferentially arcuate and is inclined to taper inwardly at about the same acute angle. A series of equally circumferentially spaced bores 71 extend around the tire seating portion 62, preferably one for each projection as shown in FIG. 8.

The tire seating portion 62 of the outer rim has a radially inwardly extending lip 72 providing the flat side surface of a recess 73 having a substantially cylindrical surface 74 adapted in the assembly of FIG. 1 to receive the pilot surface 59 of the inner rim. Surface 74 may be tapered to accept any taper of surface 59 for snug assembly.

FIGS. 12–15 show the annular tire 33 which comprises an integral annulus of synthetic rubber or like resilient material having flat parallel side surfaces 75 and 76 normal to the drive wheel axis. The outer periphery of the tire is formed with the central concave recess 34 bounded at opposite sides by cylindrical edge bands 77 and 78.

Figure 14:
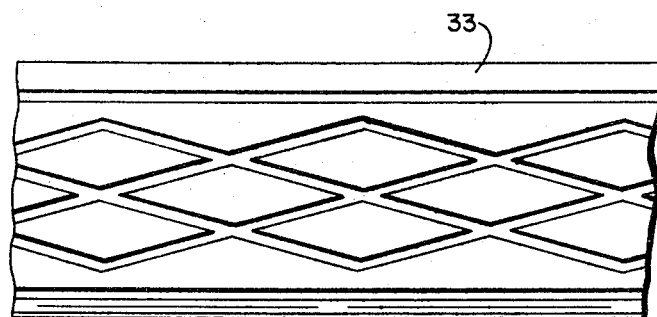
FIG. 14 is an enlarged fragmentary view in section showing the shape of the annular rim receiving recess at each side of the tire of FIGS. 12 and 13.
Figure 15:
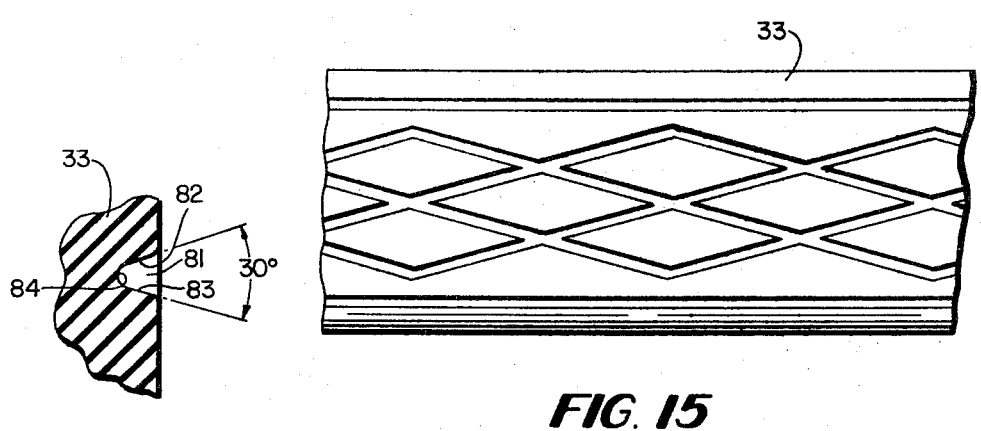
FIG. 15 is a plan view showing a form of tire tread for improved traction of the drive wheel assembly with the cable.

Opposite side surfaces 75 and 76 are formed about midway between the inner and outer peripheries of the tire with identical similarly located annular recesses 79 and 81 respectively. Recess 81 as shown in FIG. 14 has opposite sides 82 and 83 converging inwardly at an acute angle, about 30°, and merging to an arcuate bottom surface 84. The size recesses 79 and 81 corresponds to that of the identical ribs 52 and 64 of the wheel rim whereby in the assembly each rib fits tightly in a tire side recess. Since the ribs and tire recesses are all at the same location radially of the assembly, the tire is reversible end for end in the assembly.

The inner periphery of the tire comprises two sets of oppositely inclined identical projections 85 spaced by identical recesses 86. The side surfaces 90 of the projections and recesses lie in radial planes. The projections of the respective sets are axially aligned, and their rim engaging surfaces 87 and 88 respectively are inclined to taper inwardly of the tire to meet at the center indicated at 89 in FIG. 13 in a smooth face. The bottom surfaces 91 and 92 of the recesses of the respective sets are also inclined to taper inwardly to meet centrally.

The projections 85 and recesses 86 of the inner periphery of the tire are the same in number size, and location as the projections and recesses of the inner and outer wheel rims in the assembly, so that in the assembly each recess and projection of the tire will align with and fit axially slidably into a projection and recess respectively of a rim member, to provide a secure axially fixed non-rotatable mounting of the tire on the wheel rim.

The inner and outer rims are held in tight assembly by a series of bolts 93 (FIG. 2) passing through bores 71 and 58, with the rims being centered and relatively axially located by the pilot fit of boss 49 into recess 74.

The entire drive wheel assembly, see FIG. 2, is removably mounted as by lug bolts passing through wheel rim holes 48 and matching holes 95 in the wheel support plate. Thus either wheel assembly may be independently removed, as for service.

Moreover each tire of each wheel assembly may be removed and changed without removal of the entire wheel assembly, simply by removing bolts 93 and pulling off the outer rim. This is a practical feature hitherto not provided in tramway drive wheels.

The hydraulic brake cylinder and the brake shoes for drum 49 are mounted on a spider plate 96 fixed on an annular adapter collar 97 secured as by bolts 99 to wheel housing boss 19. Collar 97 surrounds the shaft 23 and suitable dust and liquid tight sealing means is provided at 98 to protect the bearings and drive gearing.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. An aerial tramway drive wheel comprising inner and outer wheel rim members detachably secured together for axial assembly and separation, axially inwardly projecting annular portions on said members, and similar oppositely inwardly inclined external peripheral tire mounting surfaces on said portions, each said surface being formed with circumferentially alternate axially extending projections and peripherally open recesses.

2. In the tramway drive wheel defined in claim 1, said wheel rim members having said tire mounting surfaces formed on similar opposed and axially projecting portions that abut endwise in a plane centrally of the wheel.

3. In the tramway drive wheel defined in claim 1, said wheel rim members being formed radially outwardly of said tire mounting surfaces with similar opposed inwardly projecting tire side engaging ribs.

4. In the tramway drive wheel defined in claim 1, said axially projecting wheel rim portion being provided with axially interfitting pilot and recess formations radially inwardly of said tire mounting surfaces.

5. In the tramway drive wheel defined in claim 1, each adjacent projection and recess at the tire mounting surface of each wheel rim member having a common flat radial side surface, and the top and bottom surfaces respectively of the projections and recesses on each wheel rim member lying substantially in coaxial conical envelopes.

6. An aerial tramway drive assembly comprising inner and outer wheel rim members detachably secured together for axial assembly and separation, said members having similar oppositely inwardly inclined annular tire mounting surfaces each formed with circumferentially alternate axially extending projections and peripherally open recesses, and a resilient tire mounted between said members, said tire having its inner periphery bridging both of said tire mounting surfaces and formed with two similar rows of circumferentially alternate inwardly inclined projections and inwardly open recesses so as to be conformed in contour to positively interlock with said rim members at said surfaces.

7. In the tramway drive assembly defined in claim 6, said tire being formed on opposite sides with annular surface recesses and said wheel rim members having projecting ribs fitting into said annular recesses.

8. An aerial tramway drive assembly wherein a power driven shaft is rotatably mounted in a housing and a drive wheel is mounted outside the housing on a projecting end of said shaft, said drive wheel comprising an inner rim member secured to said shaft, an outer rim member removably secured to said inner rim member said rim members having similar oppositely inwardly extending annular tire mounting surfaces, and a resilient tire non-rotatably mounted on and between said rim members bridging said surfaces whereby said tire may be removed and/or installed without dismounting said inner wheel rim member from said shaft.

9. The tramway drive assembly defined in claim 8, wherein a brake drum rigidly projects from said inner wheel rim member toward the housing, and brake mechanism associated with said drum is mounted on a support fixed to said housing.

10. A tire for a tramway drive wheel assembly comprising an integral annulus of resilient material having an outer concave cable engaging periphery and a wheel rim mounting inner periphery that consists essentially of two similar rows of circumferentially alternate inwardly inclined projections and peripherally inwardly open recesses extending axially from opposite sides of the annulus.

11. The tire defined in claim 10, wherein said annulus has substantially flat sides each formed with a similar annular surface recess of substantially the same diameter.

12. The tire defined in claim 10, wherein each adjacent projection and recess of each said row has a common flat radial side surface, and the top and bottom surfaces respectively of the projections and recesses of each row lying substantially in coaxial conical envelopes.

* * * * *